United States Patent [19]
Griffin et al.

[11] Patent Number: 5,128,654

[45] Date of Patent: Jul. 7, 1992

[54] PRESET LIGHT CONTROLLER INCLUDING INFRARED SENSOR OPERABLE IN MULTIPLE MODES

[75] Inventors: Raymond T. Griffin, Plano, Tex.; Steven R. Carson, Upper Saddle River, N.J.

[73] Assignee: Lightolier Incorporated, Secaucus, N.J.

[21] Appl. No.: 484,066

[22] Filed: Feb. 23, 1990

[51] Int. Cl.⁵ .............................................. G08B 13/18
[52] U.S. Cl. ................................... 340/567; 250/342; 250/353; 340/309.15; 340/528; 340/600; 340/825.65
[58] Field of Search .............. 340/567, 600, 573, 528, 340/309.15, 825.65; 250/214 AL, 221, 342, 353; 362/802; 377/20, 25, 53; 315/134, 149; 174/53

[56] References Cited

U.S. PATENT DOCUMENTS

| | | | |
|---|---|---|---|
| 4,663,521 | 5/1987 | Maile | 250/221 |
| 4,703,171 | 10/1987 | Kahl et al. | 250/221 |
| 4,745,400 | 5/1988 | Miura | 340/567 X |
| 4,768,020 | 8/1988 | Chen | 340/567 |
| 4,797,657 | 1/1989 | Vorzimmer et al. | 340/567 X |
| 4,799,243 | 1/1989 | Zepke | 340/567 X |
| 4,843,283 | 6/1989 | Chen | 340/567 X |
| 4,847,485 | 7/1989 | Koelsch | 250/221 |
| 4,873,469 | 10/1989 | Young et al. | 340/567 X |
| 4,890,093 | 12/1989 | Allison et al. | 340/567 |
| 4,894,601 | 1/1990 | Watkins | 340/567 X |

*Primary Examiner*—Glen R. Swann, III
*Assistant Examiner*—Thomas J. Mullen, Jr.
*Attorney, Agent, or Firm*—Dennis T. Griggs

[57] ABSTRACT

A junction box mounted infrared motion detector is set forth. It incorporates push button controls mounted on a box which has a Fresnel lens looking into the immediate vicinity and which encloses an infrared detector to sense an intruder. An ambient light photocell responsive to visible light is also included to enable the device to be switched off in the daytime and on at nighttime. The circuit controls a remotely powered lamp or other alarm device. The electrical current to the lamp is adjustable by means of a slide control.

7 Claims, 2 Drawing Sheets

PRESET LIGHT CONTROLLER INCLUDING INFRARED SENSOR OPERABLE IN MULTIPLE MODES

BACKGROUND OF THE DISCLOSURE

The present disclosure is directed to an infrared motion sensor and more particularly to a device which can be installed typically on a wall for observing motion in a given area nearby, and which forms an output for operation when a particular preset level has been triggered. The device is furnished with both manual and automatic modes of operation. The device of the present disclosure is particularly intended to be installed in a wall mounted junction box and, in that sense, is made rather small and is made small so that it is relatively unobtrusive. It is adapted to be mounted at a wall switch location which is typically between four and five feet above the floor, and it has a field of view or vision which encompasses a significant portion of the near vicinity. It is the kind of device which can be used to detect any unintended intruder at all hours of the day or night. While day use is permitted, night time use is the most common time and enables this apparatus to fully exploit its benefits. It is the type of device which can be somewhat tailored to an installation so that, after purchase, it can be mounted and installed on the wall, adjusted once or twice and thereafter be left without subsequent attention. This enables the device to be mounted, adjusted and left after installation and adjustment for an indefinite interval.

Some motion detectors use a light beam and photocell arrangement to detect motion. Another form of motion detector is an ultrasonic standing wave generating system which incorporates a mechanism responding to disturbances in the standing wave. In both instances, some kind of signal source is required, such as a remote lamp. The present apparatus does not require a cooperative remote lamp or the like. Rather it is an infrared detector which is a passive listening device. It is passive in the sense that it avoids the necessity of a companion, but remotely, installed piece which transmits through space to either set up a barrier or field pattern in space for detection of an intruder. This apparatus thus responds to the mere presence of the intruder and provides an output indication when that occurs. The present apparatus is, therefore, a passive device. It is passive in the sense that it does not require a remote cooperative piece of equipment. It is, however, relatively accurate in that it will detect temperature change caused by a target of a certain size within the field of view. It can be adjusted so that images of a person are detected. It can be adjusted to view an area above small pets and game, or any other relatively small animal passing nearby. Whatever the basis for adjustment, such adjustments are made so that a threshold disturbance is required for triggering operation of the device.

The present apparatus is installed with a lens having a wide angle opening or aperture. The field of view can be adjusted by moving the infrared sensitive detector. The present apparatus deploys an infrared detector at a relative location adjacent to a Fresnel lens which directs heat from the immediate vicinity to the detector. The relative position of the detector to the Fresnel lens is changed by means of simple adjustments which move the two components relative to one another; one result of such adjustments changes the field of view somewhat so that this field can be shifted or shaped. The field can be widened or narrowed, and can otherwise be reshaped so that the installation is sensitive to a particular area in view of the device and is able to form a response in a controlled fashion resulting from such movement between the detector and the Fresnel lens. This device is relatively small and does not otherwise significantly protrude into the room and can be routinely mounted within a conventional junction wall box and has a face plate which is approximately equal in size to the face plate of typical electrical fixtures installed on the wall.

The output of the device can be adapted for several type output devices. In one example, it can be a remote alarm sensor so that the signal formed thereby is transferred elsewhere. In another instance, it can be a system which forms a control signal for simply switching on a light at night in the immediate vicinity. There are other ways of using the present apparatus, but one premier feature is that the device makes detection of movement and forms a useful signal which is transmitted elsewhere for switching the output, thereby triggering a change in lighting, sounding an alarm, or providing any other type of output.

One feature of the present apparatus is the relative small size which enables mounting in a fashion most readily accommodated by electrical wiring in and about a building or other area. An important feature related to that is the use of the present device with an adjustable optical system so that the uniformly manufactured device can, nevertheless, be customized at the time of installation. Yet another advantage of the present apparatus is the fact that it has both manual and automatic modes of operation. It can be operated in either mode. When initially placed in the automatic operating mode, there is an override for a few seconds delay in operation to permit a person to set the device and leave the immediate area without tripping the device. In other words, this permits the owner or user to set the device, leave the room while switching a light off manually, and yet leave the apparatus in the automatic mode for detection of an intruder thereafter. Other modes of operation will follow more readily on a description of the manual and automatic modes of operation so that different uses will be understood. It can be used in conjunction with a remote alarm, perhaps to switch on a television camera to obtain an image from the area, sound an alarm, etc., all for the purpose of providing enhanced security for a given area; energy management is available for light fixtures.

The sensitivity of the device can also be adjusted. Sensitivity is in part a function of the direction and field of view of the lens system in conjunction with the detector and its connected circuitry. This can be adjusted to different areas and may change sensitivity. In the circuitry, it can be adjusted so that detected pulse sequences can indicate a more significant intrusion. Suffice it to say, the output of the present device is best connected with some type of device such as a remote light which is switched on at a threshold event of selected sensitivity.

With the foregoing in view, the present apparatus is summarized as a wall mounted relatively simple detector device which provides an output signal on movement in a selected area of an intruder or the like. It is incorporated within a relatively small housing so that it fits within the typical wall opening for a junction box, and it presents a relatively small profile which does not materially intrude into the room. In one form it can be equipped with a slide switch for adjusting the device controlled thereby, typically a lamp or other alarm device. It has additional controls for adjusting the relationship of a Fresnel lens relative to an infrared detector wherein optical sensitivity in the immediate vicinity is adjusted, and it has a threshold sensitivity circuit within permitting a different response to intrusion of a person in the observed area. Many other details will be noted in a review of the specific embodiments set forth below.

BRIEF DESCRIPTION OF THE DRAWINGS

FIG. 3 is a wiring diagram setting forth the circuit of the present disclosure and illustrating how it controls a remotely located lamp, alarm or the like.

DETAILED DESCRIPTION OF THE ILLUSTRATED EMBODIMENT

Figure 1:
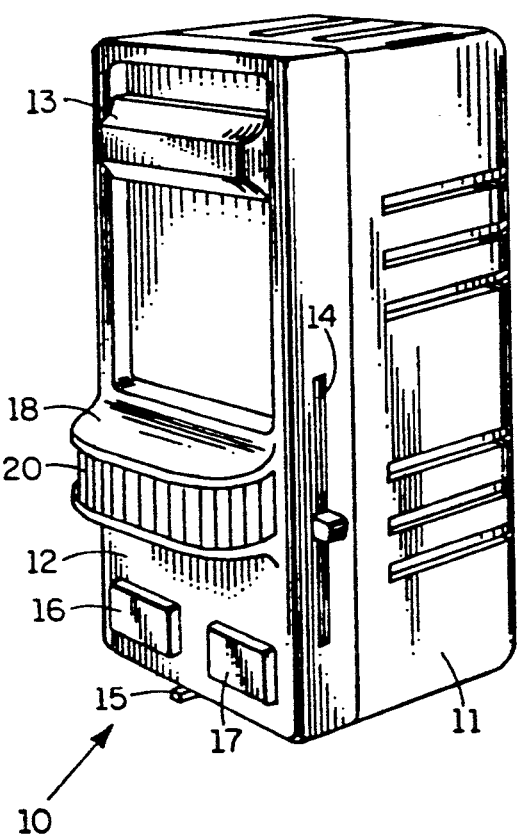
FIG. 1 is a perspective view of the device of the present disclosure showing a mounting box suitably sized for mounting within a junction box typically installed in electrical wiring.

Attention is now directed to FIG. 1 of the drawings where the numeral 10 identifies the apparatus of the present disclosure. It will be described in very general terms as an infrared sensor which is sized for mounting within a junction box, which has a preset light level sensor therein, which further has the virtue of adjustment relative to the particular field of view, and which is equipped with multiple modes of operation subject to operator control. The device is constructed with an enclosure 11 which is a surrounding housing formed of nonconductive material. There is a face 12 which is exposed. The face has the approximate size of a switch plate, and the apparatus 10 is constructed for easy hand operation by a person standing in front of the device. Moreover, the device includes a few controls as will be set forth.

One of the controls is the protruding, hand operated slide 13, connected to a slide rheostat for operation of a remotely powered load device, such as a lamp. The light intensity of the lamp is adjusted by moving the slide lever 13 upwardly or downwardly to vary the voltage. An adjustment on the side (at the slot 14) changes the horizontal field of view to provide a movable window for detecting a target having a certain minimum and maximum height. This can provide an area for pets or small children and can also block ceiling air ducts. An additional control is identified at 15 in FIG. 2 of the drawings and it is a control which is switched by fingertip movement to change the angle of the field of view. Briefly, the present system incorporates a lens and infrared detector, and they are adjusted in physical location so that the field of view is adjusted. The device does not function primarily as a beam control; rather, it accomplishes repositioning so that the field of view is generally shifted to the right or left so that the central axis of the field of view is relocated on movement.

The system additionally includes a pair of exposed push buttons, one being the manual push button 16 located on the front panel and the other being the automatic push button 17. These control the operation of the circuitry which will be described in detail hereinafter.

The present apparatus has a protruding portion 18 which is shaped in a curving profile and which supports a lens which views the immediate area. The lens is formed of a piece of sheet plastic and is marked with ruling thereon to form a Fresnel lens 20. The Fresnel lens 20 is mounted in a fixed relationship to the housing 11. It is something of a wrap-around structure. It is located so that it can view the immediate vicinity along a center line drawn to the housing, and to the right and left of that center line. The field of view upwardly and downwardly is variable and can be determined in part by the height of the Fresnel lens 20 relative to the infrared detector and photocell. The photocell is sensitive to a particular light spectrum. While any frequencies could be selected, infrared is probably the best because heated bodies give off an infrared spectra which is readily detected. The infrared photocell is positioned immediately behind the lens 20 and is moved by the control levers. It is mounted so that it is simply rotated on the stem which is rotated by the lever 15. The stem connected to the control lever 15 causes the photocell or infrared detector to rotate about a vertical axis, and the stem thus provides a measure of rotation for the photocell so that the region of directed sensitivity is controlled.

Figure 2:
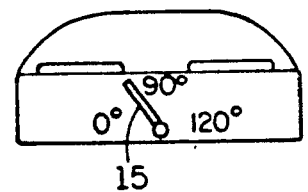
FIG. 2 is a view of a bottom located control on the box of FIG. 1.
Figure 3:
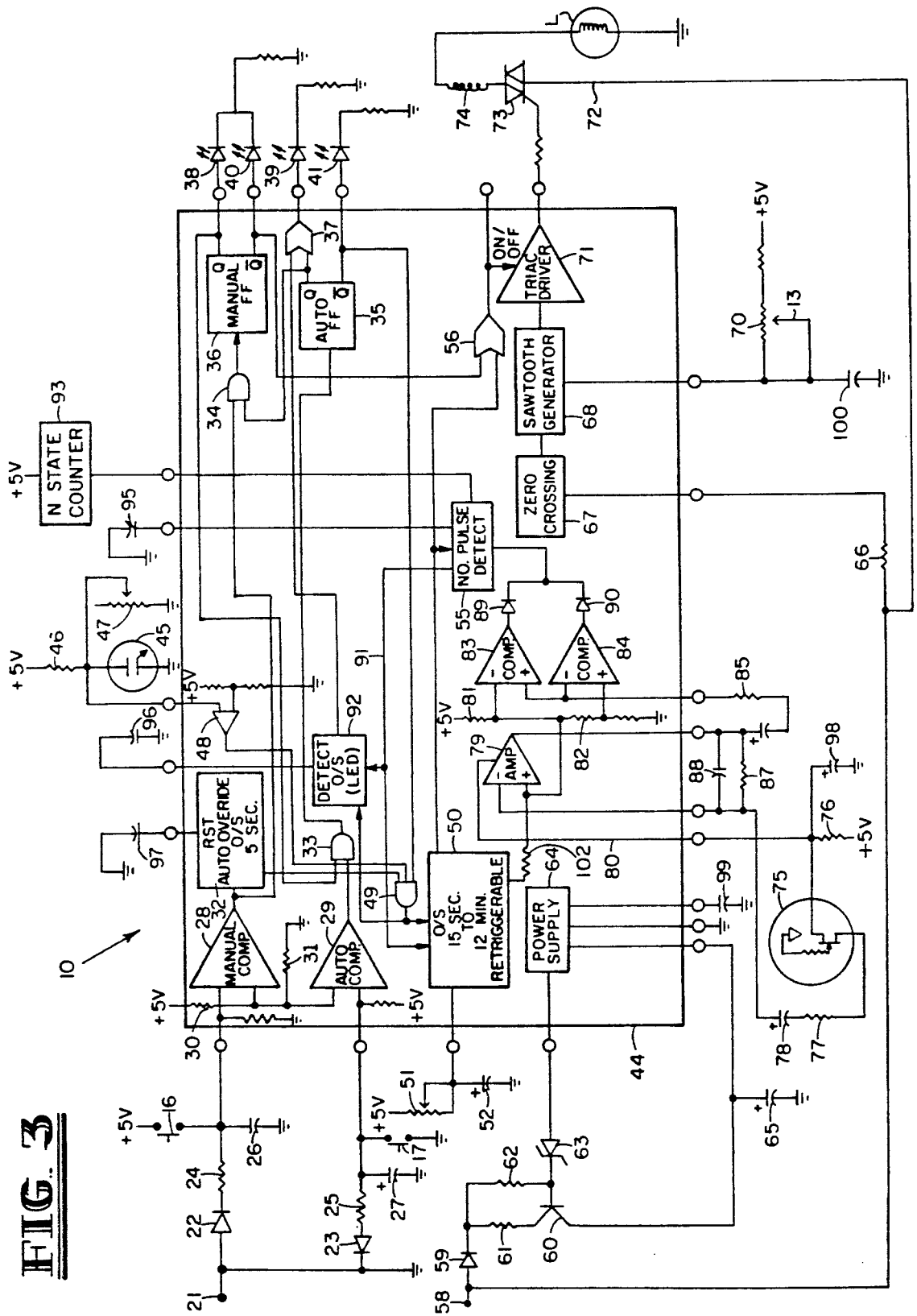

Going now to FIG. 3 of the drawings, the schematic will be described. Several of the controls which were shown in FIGS. 1 and 2 are also included in FIG. 3, and their function will be related. Accordingly, FIG. 1 shows the two push buttons at 16 and 17. They are also shown in FIG. 3. A remotely connected lead 21 connects to diodes 22 and 23 which are connected in opposite directions. This enables the switch 16 to provide three-way remote or multilocation remoting of the manual and automatic switches 16 and 17. For remote operation, this will provide positive going voltage peaks to the diode 22 when an external positive signal is applied at 21. In the opposite fashion, the diode 23 is connected to provide negative going peaks when a negative peak signal is applied at 21. They are switched under control of the manual switch 16 and the automatic switch 17, these two switches being shown on the front face. The respective diodes operate through series dropping resistors 24 and 25, and charge the illustrated filter capacitors 26 and 27. The output of both switches is identical except that one has positive going pulses and the other has negative going pulses. To this end, both output signals are provided to comparator circuits. The manual switch 16 is thus connected with the manual comparator circuit 28, while the automatic switch 17 is connected to the automatic comparator circuit 29. These two circuits are provided with a common bias defined by a series voltage divider utilizing resistors 30 and 31.

The system also includes an automatic mode override one-shot circuit 32 which forms a time delay of a specified duration, and preferably a time delay of five seconds. Clearly, a different time delay can be selected. In any event, the automatic comparator output is connected with an AND gate 33 providing an output signal used elsewhere. The output from the manual comparator 28 is connected to another AND gate 34. Thus, the output from the manual comparator is supplied to two circuits, one being the automatic override one-shot circuit 32, and the second output being provided to the AND gate 34.

The output of the manual comparator is directed through the AND gate 33 and is provided also to the automatic flip-flop 35. In similar fashion, the output of the AND gate 34 is directly connected to the manual flip-flop 36. The flip-flops function in similar fashion and have similar outputs which are labelled as the Q and Q outputs. The two flip-flops are connected to four LEDs which are identified by the numerals 38 through 41 as marked. They are shown in the circuitry as diodes; this conventional symbol also describes the light-emitting devices which provide a suitable colored light, the color encoding some condition of importance when power is applied to the respective LEDs. One of the flip-flop outputs is provided through an OR gate 37 which is connected in a fashion as will be described.

Briefly, if the switch 16 is operated, a pulse created by the diode 22 is passed to the comparator 28. This is a positive going pulse in contrast to the pulse transmitted through the diode 23. A pulse passing through the manual comparator 28 triggers the one shot 32 which will clock out a specified interval thereafter and which provides a signal for purposes to be described later. Moreover, an additional event is enabled through the AND gate 34 which ultimately triggers the manual flip-flop 36. This provides an output signal from the LEDs 38 or 40 depending on the state of the flip-flop 36. There is an interlock so that the Q output of the automatic flip-flop 35 is directed from its output to the AND gate 34, thereby providing the enable signal for the gate 36 and its operation. Moreover, the Q output from the flip-flop 35 is provided to the OR gate 37 to show operation by LED illumination. The OR gate 37, however, is provided with another input related to a one-shop operation; this will be detailed below. Suffice it to say, the manual flip-flop 36 is toggled between two states, one in providing a signal at the lamp 38 and the other providing a signal at the lamp 40. Separately, the automatic flip-flop 35 is toggled and provides signals for the LEDs 39 and 41. The LED 39 is provided with an alternate signal which comes from elsewhere so that it can be switched on by either of two signals.

Certain outboard circuitry is located in the system. It is outboard in the sense that it is manufactured and installed as a separate structure, and has discrete wired components connected with a suitable IC chip component. The line 44 thus encompasses the components which are preferably formed as an integrated circuit component. This assists in obtaining small size so that the circuitry can fit within the housing 11, see FIG. 1. The outboard circuitry thus includes the photocell 45. The light spectra sensitivity of the photocell will be discussed in detail herein. A bias point is established for that by means of a voltage divider including resistors 46 and 47. This divider is adjusted to the desired level for the maximum threshold ambient light before it allows turn on when the infrared detector detects someone. The photocell output is provided to a photocell amplifier 48. In actuality, it is preferably a comparator circuit which is connected with a selected bias voltage through a two resistor divider, and the output is then provided to an AND gate 49. That gate requires three signals to be enabled. One of the signals occurs when the one-shot 32 has clocked out. The second signal is provided from the photocell amplifier 48 as just mentioned. A third signal is the output from the automatic flip-flop 35 which is on the Q terminal. Thus, when the three signals coincide at the AND gate 49, an adjustable one-shot is then enabled for operation.

The one-shot 50 is used as the auto-mode timer. It is subject to control the load operation for selected time. Another outboard component includes an adjustable resistor 51 and grounded capacitor 52. The bias voltage which is provided on adjustment of the resistor 51 controls the timer 50. Typically, it runs from just a few seconds up to several minutes, perhaps twelve minutes or so. The output of the one-shot 50 is delivered to a pulse detector 55, and is also provided to an OR gate 56. Operation of both of these components will be described in further detail hereinafter.

The circuitry as described generally sets forth the mechanism by which control is exercised by the manual switch 16 and the automatic switch 17. Additional control is provided through the light detector (photocell) 45. The controls just mentioned control in accordance with detection, ambient lighting conditions and operator manipulation. The remainder of the description will set forth the dynamics of control in response to movement, which is detected as an infrared signal. One of the important features of the present system is the switching of electrical power and to this end, perhaps it is helpful to describe the routing of the power through the equipment. Briefly, the terminal 58 identifies a power input terminal, and power is delivered through a diode 59 to an emitter follower transistor 60. The transistor 60 is provided with a collector resistor 61 and a bias resistor 62 which is connected to the base to control operation. Moreover, base operation is in part determined by a Zener diode 63 which is provided with shut off current from a power supply 64. The power supply 64 is provided with current from the transistor 60. The power supply 64 furnishes regulated power for operation of all the IC components which are involved in the IC chip 44. Input power is filtered by a filter capacitor 65, which is again located outboard of the IC chip 44.

The power input terminal 58 is also connected through a sampling resistor 66 which then connects with a zero crossing detector 67. Zero crossing is detected (recall that the input is AC current) and that provides a signal to a sawtooth generator 68. To reset itself each time a zero crossing pulse is detected, the time for the sawtooth generator to produce an output pulse after detecting a zero crossing pulse is determined by an adjustable resistor 70 and the connected charging condensor. It forms an output waveform which is delivered through a triac driver 71, and that is switched off and on by operation of the OR gate 56 previously mentioned. The power path provides AC line current from the input terminal 58 through the conductor 72 and to a triac 73. The triac delivers output through a high frequency choke 74 which functions as an RFI suppressor. This is the switched output voltage which is able to control a remote load such as an alarm or lamp. The intensity of the lamp is adjustable, via the adjustable resistor 70. This adjustment is accomplished by hand manipulation of the slide 13 shown in FIG. 1. Slide 13 is affixed to the adjustable resistor 70. This, therefore, changes the time from zero crossing via the sawtooth generator 68 before the triac 73 is turned on. Moreover, that is subject to the permitted control through the OR gate 56. An alarm device can be directly connected to the output of the gate 56 for on/off operation.

DETECTION OF INFRARED RADIATION

The present system incorporates an infrared detector 75. It is located behind the Fresnel lens previously mentioned and is moved by the control lever shown in FIG. 2 to change its direction orientation. So to speak, it has a sensitive window which is moved. The photocell 45, by contrast, is nondirectional, and simply provides an indication that a particular ambient light threshold has been accomplished so that the equipment is switched off in the daytime if desired. Thus, when dark (visible light)

is sensed by the photocell 45, the detector 75 is enabled for action. The photocell is preferably sensitive to visible light so that apparatus 10 is switched on at night (low visible light); on that event, the detector 75 responds to a designed optical spectrum to preferably detect hot/cold body change in the field of views.

The detector 75 is provided with electrical power through a series resistor 76. The signal output is provided through a series resistor 77 and capacitor 78. The signal is input to a differential amplifier 79. Differential amplifier 79 has another input from a series voltage divider utilizing the resistors 81 and 82. These two resistors define a set point for the amplifier 79. Resistor 102 is utilized when the one shot 50 is off (no one in the room). This makes the amplifier 79 less sensitive and prevents false triggering. When someone enters the room, their entrance will be sensed. Then resistor 102 is switched out of the circuit by one shot 50 which sets the sensitivity to its maximum value.

The output of the amplifier 79 is ultimately connected to the input of two additional comparators 83 and 84. They are also provided with set point voltages from the voltage divider just identified. Moreover, the output of the comparator 79 is taken outboard, and is provided to the comparators 83 and 84 through a series RC coupling circuit including the resistor 85 and capacitor 86. In addition to that, pulse shaping is provided by a resistor 87 cooperating with a capacitor 88 connected across the amplifier 79. So to speak, they function as a low-pass circuit. This provides a type of pulse shaping so that the system has low frequency response.

It is impossible to predict in advance whether the field of vision will detect a change which is positive going or negative going. The system thus described is able to respond to either circumstance. Accordingly, a change of state is transmitted through the circuitry from the detector and is amplified, this occurring for both positive and negative going inputs. Threshold sensitivity is obtained by adjusting the various components connected to the three comparators, and the output is thus formed by the comparators 83 and 84 operating jointly. Whether a positive or negative going event occurs, such outputs are formed and delivered through the input diodes 89 and 90 to the pulse detector 55. When it triggers, it forms an output which is delivered on the conductor 91 and which serves as an enable event for the timer 50. It is also an output signal to a one-shot 92, that providing a brief or short output signal coupled through the OR gate 37, illuminating the LED 39 for a short interval.

The pulse detector 55 has an adjustment counter 93 which is located off the IC chip 44. The counter 93 is constructed to count through N where n is an adjustable number. N typically can be in the range of 1 to some larger number such as 10. N is therefore under the control of the user. Accordingly, if N is set to 5, this requires 5 pulse events in a specified interval detected by the detector 55 before the counter 93 received the image pulses. Obviously, this offboard adjustment provides a threshold setting for the pulse detector 55. If the threshold is set higher, the system remains inoperative for a longer interval. An interval, however, is determined in part by the frequency, size and spacing of pulses output by the detector 75. That is to say, those pulses are unique individual events which are counted at the pulse detector which, when it triggers, forms an enable signal on the conductor 91 which is supplied to the timer 50 previously mentioned.

There are other outboard components which have not been mentioned at this juncture. They include an outboard capacitor 95 which is suitably switched to adjust the size of the pulse necessary for operation of the pulse detector. There is another outboard capacitor 96 incorporated for the one-shot 92 which adjusts the duration of its operation. The one-shot 32 has an outboard capacitor 97 which can be varied and thereby alter the timed duration of its operation. The sawtooth generator 68 is connected with an outboard capacitor 100 to vary its operating range or sensitivity. An outboard capacitor 99 is included for the power supply to control the ripple placed on the DC voltage provided to the IC chip 44. Again, these are adjustments which are typically made only once and which are fixed, thereby permitting operation in a controllable fashion at the time of manufacture or installation.

Controls for the user should be noted. The detector 75 is moved in position by the control 15 shown in FIG. 2 and slide 14 in FIG. 1. Controls 14 and 15 are the operative components which control the field of vision for the device. In a similar fashion, but operating in an entirely different manner, the photocell 45 detects the ambient light level and provides an indication that day or night has occurred. It has a sensitivity setting by means of the resistor 47. It is adjusted to change the setpoints when day and night are defined.

The present apparatus 10 is best used to control adjacent lighting. To this end, the light level is adjusted by adjusting the resistor 70 which is physically accomplished by moving the slide 13 shown in FIG. 1. This slide control thus changes the ambient lighting which occurs when the device has been triggered. Sensitivity of the system to infrared data (hence sensitivity to signals from movement within the field of vision) is accomplished by adjustment of the N state counter 93 (that is another operator control).

The system can be placed in a manual mode by operation of the switch 16 or operation of the switch 17. When placed in an operative mode, it is equipped for operation whereby the detector 75 responds to the IR signals transmitted from the field of vision to the equipment.

Interlocking of the equipment should be noted. The timer 32 provides a time delay so that a person can set the equipment and have approximately five seconds to leave the immediate vicinity before the equipment is armed. That is, movement of a person within the field of vision during that five second interval does not cause operation. Thus, the timer 32 provides this kind of initial delay in operation.

The timer 50 determines the interval for operation of the lamp which is switched on by electrical power deliver through the triac 73. This can be adjusted to a very long interval such as fifteen minutes or so; it can be adjusted downwardly. This adjustment is accomplished at the variable resistor 51.

The various controls just mentioned operate in the fashion described. Suitable LED signals are provided from the visible displays from the diodes 38, 39 40 and 41. These can be color-coded by placing appropriate colored lenses over them. The colored lenses, in conjunction with operation of the LEDs covered thereby, provide suitable indications to an observer. They can show that the equipment is armed and ready to operate, or is in an off condition. Dependent on the manner in which the lenses are installed, proper operation can be signalled to an observer. It should be further noted that the operator can easily obtain operation simply by manipulating these controls, most of which are set and left alone after installation. Routine operation is typically obtained merely by switching the push button 16 and 17. Preferably, switches 16 and 17 include latches so that they can be depressed and locked in position.

In summary, the present apparatus is a wall-mounted, junction box sized device, a system having a field of vision which is adjustable, and which is installed in conventional electrical junction boxes with conventional wiring connected thereto, and is a system for providing sensitivity to intruders, thereby switching on a lamp or other alarm device or the like. In summary, the foregoing sets forth the preferred embodiment, but the scope is determined by the claims which follow.

I claim:

1. A passive intruder detector system comprising:
   (a) infrared detector means directed toward an area for passively forming output signals indicative of infrared communicated changes occurring in the area observed by said detector means;
   (b) alarm output means for providing an alarm signal to an alarm indicative of alarm conditions as indicated by the output signals from said detector means wherein said signal indicates an alarm event; and
   (c) circuit means connected between said detector means and said output means for receiving the output signal of said detector means and forming an alarm signal for the alarm, said circuit means including an amplifier, a pulse counter coupled to said amplifier, and means for adjusting the input signal from said infrared detector means to said amplifier, wherein said adjusting means provides discrimination of input signals to define hysteresis in the operation thereof.

2. The apparatus of claim 1 wherein:
   (a) said pulse counter is an adjustable counter;
   (b) said amplifier is a differential amplifier;
   (c) said adjusting means includes a circuit for reshaping the input amplitude and pulse duration to said amplifier; and
   (d) including means for separately amplifying positive and negative going pulses.

3. A passive intruder detector system comprising
   (a) infrared detector means directed toward an area for passively forming output signals indicative of infrared communicated changes occurring in the area observed by said detector means;
   (b) amplifier means connected to said detector means to amplify the signal provided thereby;
   (c) means connected to said amplifier means to compare the amplified signal with a threshold value to form an output signal indicative of exceeding a threshold value, said means forming an output pulse indication;
   (d) counting means connected to said means to form a count of output pulse indications, said counting means also having an adjustable input determining the number of counts required thereby; and
   (e) power switching means having
      (1) an input for power;
      (2) an output connected to an alarm load using power for operation; and
      (3) a control terminal connected to said counting means for timer controlled operation.

4. The detector system of claim 3 wherein said power switching means is a triac and said counting means is an N state counter where N is a whole number positive integer, and said power switching means includes:
   (a) a comparator having two inputs; and,
   (b) the inputs providing a fixed voltage level and a variable voltage from said amplifier means to said comparator.

5. The detector system of claim 14 wherein two comparators are connected to said amplifier means and one thereof is provided with a positive fixed voltage input and the other is provided with a negative fixed voltage input, and said comparators form outputs summed without regard to input polarity.

6. The detector system of claim 5 wherein said amplifier means is provided with an input enable pulse.

7. The detector system of claim 5 wherein said amplifier means is enabled by a timer control circuit, said timer circuit enabling operation on occurrence of selected qualifying events.

* * * * *